Patented Jan. 17, 1933

1,894,763

UNITED STATES PATENT OFFICE

OTTO EISENHUT, OF HEIDELBERG, AND HEINRICH SCHILLING, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

PURIFICATION OF GASES CONTAINING ACETYLENE

No Drawing. Application filed January 3, 1930, Serial No. 418,401, and in Germany January 16, 1929.

This invention relates to improvements in the purification of the gases containing acetylene obtained by the treatment of carbonaceous substances in the electric arc.

Gases containing acetylene, which have been obtained by the treatment in the electric arc of carbonaceous substances, such as gaseous or liquid hydrocarbons, tars and bituminous coals, are frequently contaminated by diacetylene and other strongly colored substances containing oxygen or which are readily oxidizable or substances which, at least in part, are resinifiable, and which have not hitherto been definitely characterized. The said impurities are extremely objectionable in the preparation of conversion products of acetylene, as for example acetaldehyde or acetic acid, from the said gases, since they contaminate the resulting products. Moreover, when working up gases containing nitrogen in the electric arc, cyanogen compounds are formed and these reduce the activity of the catalytic solutions in the subsequent conversion of the acetylene, for example into acetaldehyde, as for example by means of sulphuric acid solutions containing mercury. These impurities or their conversion products also occur in the products resulting from the further working up and injuriously affect their capabilities of employment. The removal of the impurities from the final product is, however, very expensive.

We have now found that the said gases containing acetylene are very efficiently purified and are rendered excellently suitable for further working up by passing these gases over active porous masses, the gases being freed by suitable means from cyanogen compounds before or after this treatment, if required. Thus, for example the objectionable colored or resinifying substances hereinbefore referred to may be entirely removed from said gases by leading them over active carbon or active silica, or alumina gel or Florida earth or diatomaceous earth. This operation is usually carried out at about room temperature or below, but the temperature should not be so low that the gases liquefy. The pressure employed may be atmospheric or in excess of atmospheric. The adsorbed impurities may be recovered from the adsorbents, for example by means of steam, and may be used for other purposes. The adsorbents may also be freed from impurities by reducing the pressure thereon or by heating or any of these methods combined. Prior or subsequently to the treatment with the active masses, the cyanogen compounds may be removed, for example by washing with a solution of a ferrous salt, for example ferrous sulphate, and recovered in the form of valuable complex iron-cyanogen compounds. They may also be removed for example, by washing with caustic soda or potash solutions, or by treatment with iron oxide or bog-iron ore.

The conversion products obtained from the acetylene prepared by the treatment in the electric arc and after the treatment according to this invention, as for example acetaldehyde or acetic acid, are completely water-white and clear and may be directly employed for any further process of working up.

The following examples will further illustrate the nature of this invention, but the invention is not restricted to these examples.

Example 1

A mixture of methane and hydrogen containing 40 per cent of methane yields a gas mixture which contains about 8 per cent of acetylene and a little ethylene, by passage through an electric arc. In this mixture there are also small amounts of diacetylene as well as strongly reactive substances, as for example readily polymerizable substances, such as allylene, isoprene, butylene and the like, as impurities. This gas mixture is led at ordinary or slightly reduced temperature over active carbon and is then converted into a concentrated acetylene gas mixture by washing under pressure with a solvent, as for example cyclohexanone, and releasing the pressure. In order to prepare acetaldehyde the resulting gas mixture is then led at 80° C. through a sulphuric acid solution containing mercury and pure acetaldehyde is obtained.

Example 2

Coke-oven gas having the usual composition is passed through an electric arc and a gas mixture containing 7 per cent of acetylene and small amounts of ethylene is obtained which also contains cyanogen compounds in addition to the impurities specified in Example 1. For the purpose of purification this gas mixture is led through silica gel and then, for the purpose of removing the cyanogen compounds, through a solution of ferrous sulphate. If this last-mentioned treatment be omitted, then during the further working up of the acetylene into acetaldehyde, soluble mercury cyanide forms in a short period of time in the solution of sulphuric acid containing mercury employed, and this suppresses the solubility of the mercury sulphate in the sulphuric acid in such a manner that the sulphuric acid solution becomes only slightly active as a catalytic solution for the conversion of the acetylene, or may even become quite inactive. By employing ferrous sulphate as well as silica gel, completely pure acetaldehyde is obtained from the acetylene.

What we claim is:

1. A process for the purification of gases containing acetylene obtained by the treatment in the electric arc of carbonaceous substances, and for rendering the said gases suitable for further conversion, which comprises passing the said gases over active porous masses.

2. A process for the purification of gases containing acetylene obtained by the treatment in the electric arc of carbonaceous substances, and for rendering the said gases suitable for further conversion, which comprises passing the said gases over active carbon.

3. A process for the purification of gases containing acetylene obtained by the treatment in the electric arc of carbonaceous substances, and for rendering the said gases suitable for further conversion, which comprises passing the said gases over active silica.

4. A process for the purification of gases containing acetylene obtained by the treatment in the electric arc of carbonaceous substances, and for rendering the said gases suitable for further conversion, which comprises passing the said gases over Florida earth.

In testimony whereof we have hereunto set our hands.

OTTO EISENHUT.
HEINRICH SCHILLING.